(12) United States Patent
Kim et al.

(10) Patent No.: US 9,049,638 B2
(45) Date of Patent: *Jun. 2, 2015

(54) MOBILE COMMUNICATION SYSTEM WITH DEVICE HANDOVER AND METHOD OF OPERATION THEREOF

(71) Applicant: Samsung Electronics Co., Ltd., Gyeonggi-Do (KR)

(72) Inventors: Sungsoo Kim, San Diego, CA (US); Inyup Kang, San Diego, CA (US); Jungwon Lee, San Diego, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/036,797

(22) Filed: Sep. 25, 2013

(65) Prior Publication Data

US 2014/0024381 A1    Jan. 23, 2014

Related U.S. Application Data

(63) Continuation of application No. 13/360,547, filed on Jan. 27, 2012, now Pat. No. 8,588,789.

(51) Int. Cl.
*H04W 36/00* (2009.01)
*H04W 36/32* (2009.01)
*G01S 11/06* (2006.01)
*H04W 64/00* (2009.01)

(52) U.S. Cl.
CPC .......... *H04W 36/32* (2013.01); *H04W 36/0083* (2013.01); *H04W 64/006* (2013.01); *G01S 11/06* (2013.01)

(58) Field of Classification Search
CPC ............ H04W 36/0083; H04W 36/32; H04W 64/006
USPC ........ 340/988; 342/450–465; 370/310, 310.2, 370/328, 331, 332, 338; 455/404.2, 418, 455/419, 420, 425, 432.1, 436–439, 440, 455/441–444, 456.1–456.6, 523
See application file for complete search history.

(56) References Cited

U.S. PATENT DOCUMENTS

| | | | |
|---|---|---|---|
| 5,945,948 A | 8/1999 | Buford et al. | |
| 6,204,812 B1 | 3/2001 | Fattouche | |
| 6,208,297 B1 | 3/2001 | Fattouche et al. | |
| 6,266,014 B1 | 7/2001 | Fattouche et al. | |
| 8,111,193 B2 | 2/2012 | Nurmela et al. | |
| 2004/0229616 A1 | 11/2004 | Dutta et al. | |
| 2006/0264231 A1 | 11/2006 | Zhang et al. | |
| 2007/0121739 A1* | 5/2007 | Kind | 375/260 |
| 2009/0310505 A1 | 12/2009 | Tsai et al. | |
| 2013/0064220 A1* | 3/2013 | Yin | 370/331 |

* cited by examiner

*Primary Examiner* — Dinh P Nguyen
(74) *Attorney, Agent, or Firm* — IP International Law Firm

(57) ABSTRACT

A method of operation of a mobile communication system includes: receiving a base carrier frequency signal from a cell tower location; generating a power spectral density from the base carrier frequency signal; measuring a Rician K factor from the power spectral density; estimating a line-of-sight Doppler frequency based on the base carrier frequency signal; determining the cell tower location based on the Rician K factor; and activating a handover decision handler based on the cell tower location.

14 Claims, 8 Drawing Sheets

MOBILE COMMUNICATION SYSTEM WITH DEVICE HANDOVER AND METHOD OF OPERATION THEREOF

CROSS-REFERENCE TO RELATED APPLICATION(S)

This is a continuation of co-pending U.S. patent application Ser. No. 13/360,547 filed Jan. 27, 2012.

TECHNICAL FIELD

The present invention relates generally to a mobile communication system, and more particularly to a system with a mobile device.

BACKGROUND ART

The social and economic health of a society depends on transfer or exchange of information from one geographic location to another geographic location. In the modern world, the continuous and uninterrupted flow of information can typically be transferred between different geographic locations, separated from one another by great distances, using electronic based technology solutions such as Internet exchanges, faxes, or voice communications.

Often physical movement or transportation occurs as the information is exchanged. The information is exchanged while connections are switched between a device and different locations along a travel route. The device switches connections from one location to another to prevent loss of the connections or the information being exchanged due to limited communication range or to conserve energy used to send or receive the information.

A switching event occurs each time the device switches a connection. The switching event must maintain continuous and uninterrupted service as one connection to one location is switched or exchanged for a different connection to a different location is made. There is a need for the switching events to occur quickly and sooner as methods of movement, speed of movement, or changes in travel routes improve.

There is a growing need to minimize costs, environmental carbon footprint impacts, or transportation and travel stresses in the world of mobile communications. In view of the ever-increasing social and economic mobile communication needs of the world, it is increasingly critical that answers be found to these problems.

In view of growing consumer expectations, an improved mobile communication connection system in a timely manner is highly sought after and it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a mobile communication system including: receiving a base carrier frequency signal from a cell tower location; generating a power spectral density from the base carrier frequency signal; measuring a Rician K factor from the power spectral density; estimating a line-of-sight Doppler frequency based on the base carrier frequency signal; determining the cell tower location based on the Rician K factor; and activating a handover decision handler based on the cell tower location.

The present invention provides a mobile communication system, including: an antenna for receiving a base carrier frequency signal; a digital conditioner unit for generating a power spectral density from the base carrier frequency signal; a digital signal processor for measuring a Rician K factor based on the power spectral density; a finite state machine for estimating a line-of-sight Doppler frequency based on the base carrier frequency signal; a central processor unit for determining the cell tower location based in the Rician K factor; and a device control unit for activating a handover decision based on the cell tower location.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
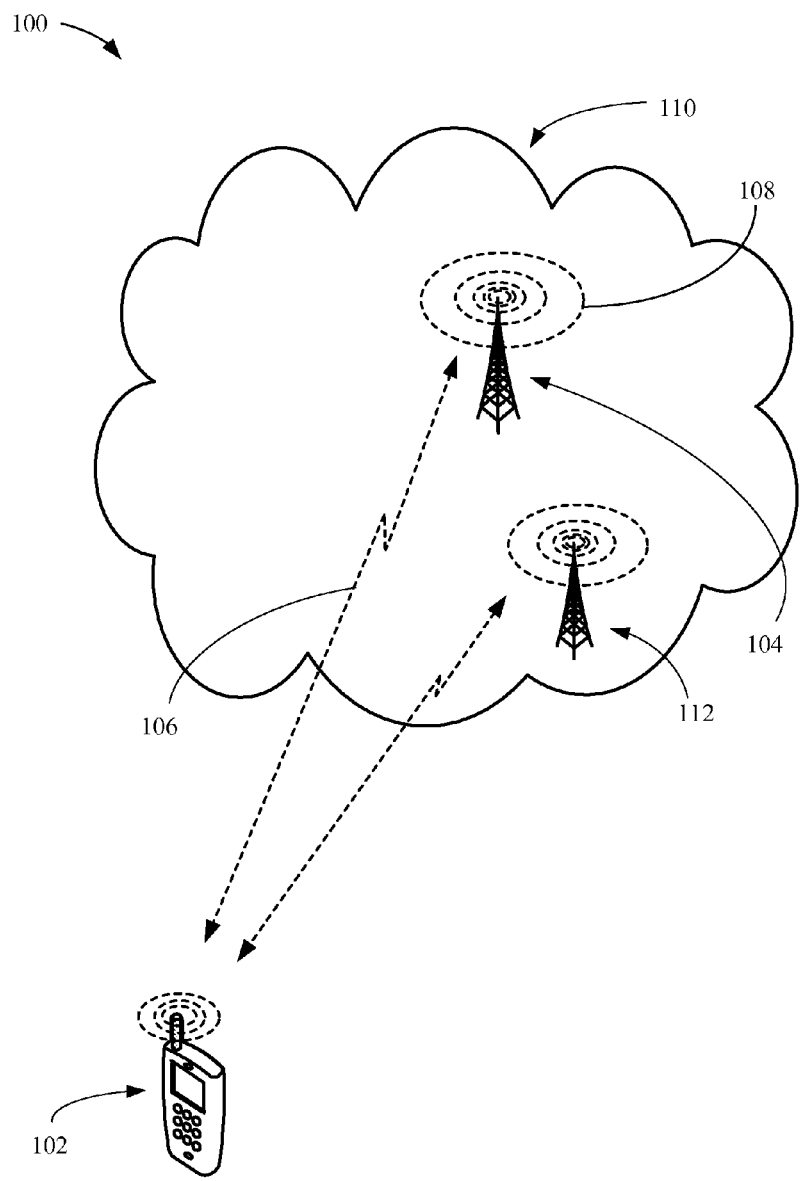
FIG. 1 is a mobile communication system with a handover processing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a micro electro mechanical system (MEMS), passive devices, or a combination thereof.

Referring now to FIG. 1, therein is shown a mobile communication system 100 with a handover processing mechanism in an embodiment of the present invention. The mobile communication system 100 includes a mobile device 102, such as a mobile client or a server, connected or coupled to a first base station 104. The first base station 104, such as a client or server, is connected or coupled to the mobile device 102 using one of many wireless connections 106, such as a radio frequency carrier based signal. The first base station 104 transmits at least a base carrier frequency signal 108.

For example, the mobile device 102 can be of any of a variety of mobile devices, such as a mobile cellular phone, personal digital assistant, a notebook computer, automotive telematic mobile communication system, or other multifunctional mobile communication or entertainment device. The mobile device 102 can be a standalone device, or can be incorporated with a vehicle, for example a car, truck, bus, or train. The mobile device 102 can communicate with the first base station 104 using one of the wireless connections 106 of a communications network 110 in the mobile communication system 100.

The communications network 110 can be of a variety of networks. For example, the communications network 110 can include wireless communication, wired communication, optical, ultrasonic, or the combination thereof. Satellite communication, mobileular communication, Bluetooth, Infrared Data Association standard (IrDA), wireless fidelity (WiFi), and worldwide interoperability for microwave access (WiMAX) are examples of wireless communication that can be included in the communications network 110. Examples of the wired communication are ethernet, digital subscriber line (DSL), fiber to the home (FTTH), and plain old telephone service (POTS).

For illustrative purposes, the mobile communication system 100 is described with the mobile device 102 as a mobile transceiver device, although it is understood that the mobile device 102 can be different types of computing devices. For example, the mobile device 102 can also be a non-mobile computing device, such as a server, a server farm, or a desktop computer.

The first base station 104 can be any of a variety of centralized or decentralized computing devices. For example, the first base station 104 can be a computer, a grid computing resource, a communication bridge, a communication router, a virtualized computer resource, cloud computing resource, a communication hub, a peer-to-peer distributed computing device, or a combination thereof.

The first base station 104 within the communications network 110 can be centralized in a single computer room, distributed across different rooms, distributed across different geographical locations, or a combination thereof. The first base station 104 can have a means for coupling or connecting to one of the wireless connections 106 to communicate with the mobile device 102. The first base station 104 can also be a client type device as described for the mobile device 102.

In a further example, the mobile device 102 can be a particularized machine, such as a mainframe, a server, a cluster server, rack mounted server, or a blade server, or as more specific examples, an IBM System z10™ Business Class mainframe or a HP ProLiant ML™ server. Yet further example, the first base station 104 can be a particularized machine, such as a portable computing device, a thin client, a notebook, a netbook, a smartphone, personal digital assistant, or a mobileular phone, and as specific examples, an Apple iPhone™, Samsung Galaxy™, Palm Centro™, or Moto Q Global™.

For illustrative purposes, the mobile communication system 100 is described with the first base station 104 as a non-mobile computing device, although it is understood that the first base station 104 can be different types of computing devices. For example, the first base station 104 can also be a mobile computing device, such as notebook computer, another client device, or a different type of client device. The first base station 104 can be a standalone device, or can be incorporated with a vehicle, for example a car, truck, bus, or train.

Also for illustrative purposes, the communications network 110 is shown with the first base station 104 coupled or connected to the mobile device 102 by one of the wireless connections 106 and a second base station 112. The second base station 112 can be similar or identical to the first base station 104. The second base station 112 is available to be coupled by the mobile device 102 or another device similar to the mobile device 102.

It is understood that the communications network 110 in the mobile communication system 100 includes at least two base stations, such as the first base station 104 and the second base station 112. For example, have the communications network 110 can include one hundred base stations similar or identical to the first base station 104 or the second base station 112.

Also for illustrative purposes, the wireless connections 106 are shown separated from the first base station 104, the second base station 112, and the mobile device 102. It is understood that the first base station 104, the second base station 112, the mobile device 102, or any combination thereof can also function as a part of the wireless connections 106. For example, the mobile device 102, the first base station 104, and the second base station 112 can function as part of one of the wireless connections 106 to couple the mobile device 102 with the first base station 104.

The wireless connections 106 can include a variety of different networks. For example, the wireless connections 106 includes wireless communications that can include mobileular communications, Bluetooth, wireless fidelity (WiFi), worldwide interoperability for microwave access (WiMAX), or any combination thereof. Further, the wireless connections 106 can traverse a number of network topologies and distances. For example, the wireless connections 106 can include a personal area network (PAN), a local area network (LAN), a metropolitan area network (MAN), a wide area network (WAN), or any combination thereof.

Figure 2:
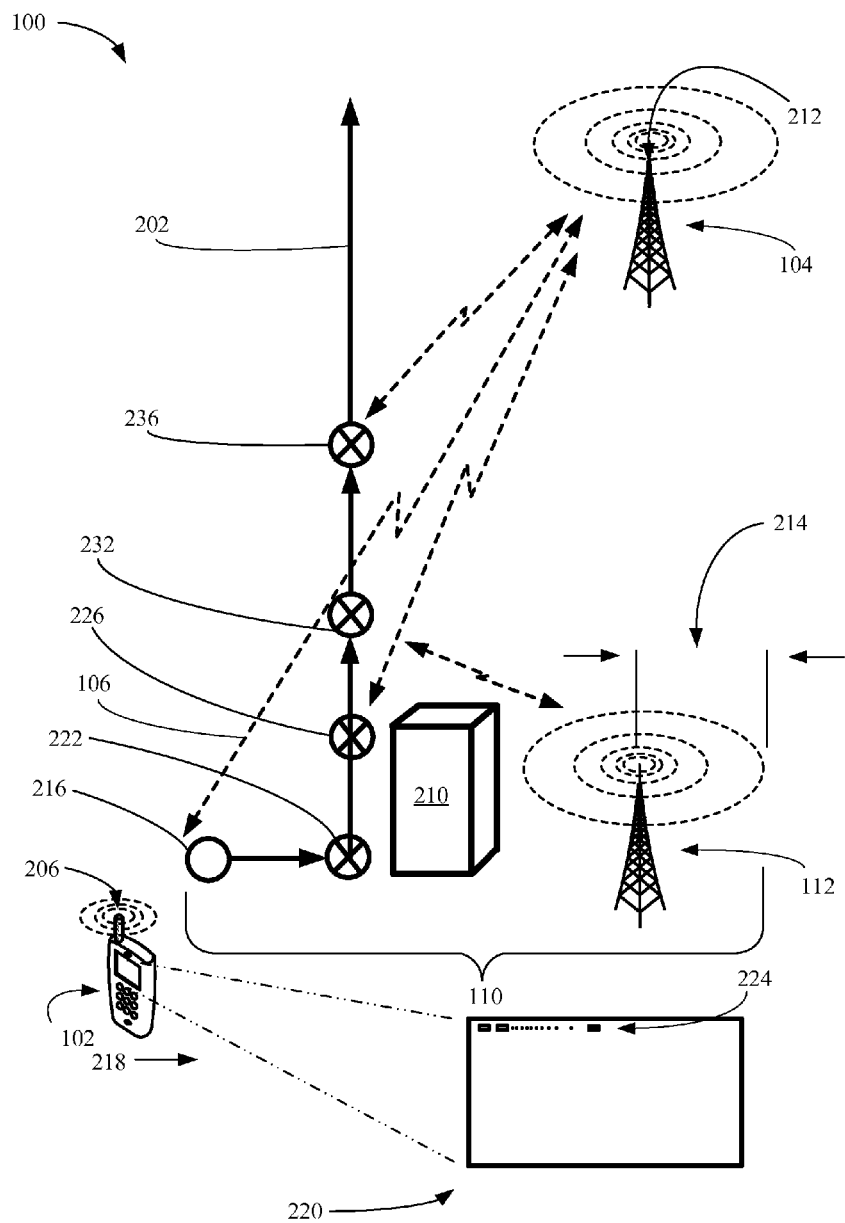
FIG. 2 is a detailed example of the mobile communication system of FIG. 1 with the mobile device during movement.

Referring now to FIG. 2, therein is shown a detailed example of the mobile communication system 100 of FIG. 1 with the mobile device 102 during movement. A path 202, defined as a route the mobile device 102 moves relative to the first base station 104 and the second base station 112, is shown.

For illustrative purposes, the path 202 is shown having straight segments. The path 202 can have any number of segments with any shapes or directions. For example, the path 202 can include different elevations and curved segments.

An antenna 206 of the mobile device 102 is defined as a structure as part of the mobile device 102 for receiving or transmitting radiated energy that can include an electromagnetic wave having at least one frequency of oscillation to form one of the wireless connections 106 with the first base station 104. Cell tower locations 212 are defined as locations of a structure associated with each base station used to receive or transmit the base carrier frequency signal 108 of radiated energy that can include an electromagnetic wave having at least one frequency of oscillation to complete the wireless connections 106 with the antenna 206.

Each base station transmits a cell identifier that is unique from any other cell identifier within the communications network 110. The cell identifier can be encoded information transmitted as binary, pulse modulated, or amplitude modulated data and used to identify a base station from any other base station within the communications network 110.

A signal blocker 210, defined as a naturally occurring or a manmade structure capable of absorbing or reflecting power of the radiated energy of the wireless connections 106, is shown between the path 202 and the second base station 112 in the communications network 110. The signal blocker 210 can include a building, a tree, a mountain, or a different structure having similar properties of absorbing or reflecting radiated energy power.

For illustrative purposes, the communications network 110 is shown having only a single instance of the signal blocker 210. It is understood that the communications network 110 can have more similar or different types of the signal blocker 210. For example, the communications network 110 could include five signal blockers, each similar to the signal blocker 210.

Properties of the signal blocker 210, such as size, shape, or material, can determine power magnitudes 214 of the radiated energy from the cell tower locations 212. The signal blocker 210 can absorb or reflect the radiated energy from the cell tower locations 212 or the mobile device 102.

The mobile device 102 at a starting position 216 on the path 202 can be initially enabled or powered-up by a user to connect to the first base station 104 or the second base station 112 for an information exchange such as an Internet exchange, a fax, a voice communication, or any combination thereof. The antenna 206 of the mobile device 102 detects the radiated energy received from any of the cell tower locations 212.

The radiated energy from the cell tower locations 212 can be unobstructed, reflected, or partially absorbed as a result of the signal blocker 210. The radiated energy can include a dominant peak energy component or line-of-sight component (LOS component) defined as single power peak having a magnitude greater than any other power peak within a power spectral density distribution received from the radiated energy detected from the cell tower locations 212.

The power spectral density distribution, also referred to as PSD or bandwidth spread, is defined as a range of different frequencies from which each frequency has a measurable level of power or energy. Detection of the dominant peak energy component at one frequency within the range of the different frequencies of the power spectral density distribution from a single source, such as the first base station 104, the second base station 112, or the mobile device 102, is characteristic of a channel called a Rician fading channel energy distribution.

Detection of a power spectral density distribution from a single source lacking a dominant peak energy component or having multiple energy peaks of similar magnitude from a single source is characteristic of a channel called a Rayleigh fading channel energy. The single source can include either the first base station 104, the second base station 112, or the mobile device 102. A Rician K factor, also referred to as a Rician factor or K, is defined as a power ratio of the LOS component to a Rayleigh component.

The mobile device 102 checks the radiated energy from each of the cell tower locations 212 for a dominant peak energy component. The mobile device 102 can continuously or periodically monitor for the radiated energy from the cell tower locations 212 depending on rate of movement of the mobile device 102 or quantity or power levels of the radiated energy.

In a Ricain frequency-flat fading channel, the received signal, y(t), can be written or expressed as:

$$y(t) = \sqrt{\frac{P}{K+1}}\, h(t) + \sqrt{\frac{KP}{K+1}}\, \exp(j2\pi f_D \cos(\theta)t + \psi) + n(t)$$

where h(t) and n(t) represent the Rayleigh-distributed random diffuse component and the complex Gaussian random noise, respectively. In the above equation, the second term represents the deterministic line-of-sight (LOS) component. Moreover, P is the received signal power, K is the power ratio of LOS component to Rayleigh component, $\theta$ is an arrival angle or angle of arrival between mobile direction and base station, $\psi$ is the phase of the LOS component, $f_D = v/\lambda = vfc/c$ is a Doppler frequency, v is a mobile speed 218, $\lambda$ is a wavelength, fc is a carrier frequency, and c is the speed of light. Note that the channel becomes Rayleigh when K=zero.

The antenna 206 of the mobile device 102 receives a dominant peak energy component from the first base station 104, indicative of a Rician fading channel energy distribution. The antenna 206 receives a power spectral density distribution without any dominant peak energy component from the second base station 112, indicative of a Rayleigh fading channel energy distribution.

The mobile device 102 determines if the dominant peak energy component from the first base station 104 is greater than power energy magnitudes of the power spectral density distribution from the second base station 112. The mobile device 102 connects to the first base station 104 having the greater radiated power using the wireless connections 106.

The movement of the mobile device 102 relative to the first base station 104 or the second base station 112 results in a Doppler or line-of-sight (LOS) frequency detected or perceived by the mobile device 102. The Doppler frequency is defined as a detected or perceived change in wavelength and corresponding frequency received by the mobile device 102 from a transmitting source, such as the first base station 104 or the second base station 112, that is transmitting at a fixed wavelength and corresponding frequency.

A range of Doppler frequencies bounded by a minimum and maximum Doppler frequency is defined as a Doppler frequency spread of the Rician or the Rayleigh fading channel energy distribution. The Doppler frequency spread of the Rician or the Raleigh fading channel energy distribution can be used to calculate the mobile speed 218 of the mobile device 102.

A Doppler frequency at the dominant peak energy component and the Doppler frequency spread of the Rician fading channel energy distribution can be used to calculate an angle of arrival of the mobile device 102 relative to the first base station 104. The Doppler frequency at the dominant peak energy component and the Doppler frequency spread of the Rician fading channel energy distribution are received by the mobile device 102.

An enlarged view of a display screen 220 of the mobile device 102 is shown. The display screen 220 can be used to display information, such as time, date, usage, operational, or a combination thereof of information, from the mobile device 102 to a user of the mobile device 102.

The movement of the mobile device 102 towards a second handover position 222 on the path 202 results in the dominant peak energy component and the power spectral density distribution from the first base station 104 to decrease due to the properties of the signal blocker 210. The power spectral density distribution received, absent of a dominant peak energy component from the second base station 112, increases in magnitude as the mobile device 102 approaches the second handover position 222.

A signal strength indicator 224, such as a horizontal row of horizontal bars, a horizontal row of vertical bars, a solid horizontal bar, symbols, characters, or a combination thereof of indicators, can be displayed on the display screen 220. The signal strength indicator 224 can be used to indicate a power levels of the radiated energy received by the mobile device 102.

For example, a horizontal row of horizontal bars can have a composite length longer during periods of strong power levels and shorter during periods of weak power levels. The update or sampling rate of the mobile device 102 used to generate the signal strength indicator 224 can be pre-selected by the user.

The mobile device 102 determines the mobile speed 218 of the mobile device 102 relative to the second base station 112 using the Doppler frequency spread received from the second base station 112. The mobile device 102 determines both the mobile speed 218 and the angle of arrival relative to the first base station 104 using the Doppler frequency spread and the Doppler frequency dominant peak energy or LOS component in the Rician fading channel energy distribution detected from the first base station 104.

The mobile device 102 prepares for a handover event at the second handover position 222. The handover event, also referred to as a handover, is defined as a process in which the mobile device 102 drops one of the wireless connections 106 from a base station to connect to a different base station using another of the wireless connections 106.

The handover event of the mobile device 102 includes a detection, an authentication, an evaluation, a release, or a connection of one or more base stations by the mobile device 102. The detection by the mobile device 102 can include detection of a Doppler LOS frequency peak, a Doppler LOS power or energy peak, a Doppler frequency spread, or a Doppler spectral power spread.

The authentication by the mobile device 102 can include expected Doppler frequencies based on anticipated carrier frequencies of base stations or anticipated cell identifier information from the base stations in the communications network 110. The evaluation by the mobile device 102 can include calculations or comparisons of the signals and information received from the base stations.

The release of the mobile device 102 can include a determination and execution of when, where, and how the mobile device 102 is to drop a wireless connection from one base station. The connection of the mobile device 102 can include a determination and execution of when, where, and how the mobile device 102 is to connect to a wireless connection of another base station.

The mobile device 102 can include further cycles of the detection, the authentication, the evaluation, the release, or the connection to any base station as needed. The base station and the different base station can be similar to the first base station 104 and the second base station 112, respectively. The handover is used to prevent loss or interruption of communication between the mobile device 102 and the communications network 110.

The mobile device 102 performs a handover at the second handover position 222 from the first base station 104 to the second base station 112 using another of the wireless connections 106. The signal blocker 210 blocks the dominant peak energy component from the first base station 104 resulting in the mobile device 102 receiving Rayleigh fading channel energy distributions from both the first base station 104 and the second base station 112.

The mobile device 102 determines the mobile speed 218 of the mobile device 102 using the Doppler frequency spread received from the first base station 104. The mobile speed 218 of the mobile device 102 indicates that the speed is increasing towards the first base station 104 and thus approaching or heading towards the first base station 104.

The composite length of the horizontal row of horizontal bars of the signal strength indicator 224 can be reduced as the power levels received from the second base station 112 and the first base station 104 decrease. The mobile device 102 determines from the Doppler frequency spread of the Rayleigh fading channel energy distribution that the mobile speed 218 relative to the second base station 112 has decreased, stopped, and increasing at a rate slower than the increasing speed towards the first base station 104. The mobile speed 218 relative to the second base station 112 indicates to the mobile device 102 that the mobile device 102 is no longer heading directly towards the second base station 112.

The composite length of the horizontal row of horizontal bars of the signal strength indicator 224 increases in length as the power levels received from the first base station 104 increases as signal absorption or reflection effects of the signal blocker 210 diminish. The mobile device 102 proceeds to a third handover position 226 on the path 202 and detects a dominant peak energy component from the first base station 104.

A handover from the second base station 112 to the first base station 104 occurs at the third handover position 226. The composite length of the horizontal row of horizontal bars of the signal strength indicator 224 continues to increase in length as the power levels received from the first base station 104 increases.

The mobile device 102 receives the Doppler frequency at the dominant peak energy component and the Doppler frequency spread of the Rician fading channel energy distribution from the first base station 104. The mobile device 102 determines an angle of arrival and the mobile speed 218 of the mobile device 102 relative to the first base station 104.

The mobile device 102 proceeds to a fourth handover position 232 on the path 202. The mobile device 102 receives a dominant peak energy component from the second base station 112 having a power peak greater than a power peak of the first base station 104. A handover from the first base station 104 to the second base station 112 occurs at the fourth handover position 232 to provide improved signal to noise ratios.

The mobile device 102 determines an angle of arrival and the mobile speed 218 of the mobile device 102 relative to the second base station 112. The mobile device 102 receives a dominant peak energy component from the first base station 104 with the dominant peak energy increasing in magnitude as the dominant peak energy component from the second base station 112 decreases. The composite length of the horizontal row of horizontal bars of the signal strength indicator 224 continues to increase in length as the power levels received from the second base station 112 increases.

The mobile device 102 uses direction of movement of the mobile device 102. Updates on the mobile speed 218, and locations of the first base station 104 and the second base station 112, to determine an optimum handover on the path 202 for another handover. The optimum handover is defined as a position on a path, similar to the fourth handover position 232 that will provide maximum signal to noise ratios of radiated power between the mobile device 102 and base stations, similar to the first base station 104.

The optimum handover prevents any connectivity or communication interruptions between the mobile device 102 and the communications network 110 before, during, and after the handover. The mobile device 102 proceeds to a fifth handover position 236 on the path 202. The composite length of the horizontal row of horizontal bars of the signal strength indicator 224 momentarily decreases in length as the power levels received from the first base station 104 further increase while the power levels received from the second base station 112 decrease.

A handover from the second base station 112 to the first base station 104 occurs at the fifth handover position 236. The composite length of the horizontal row of horizontal bars of the signal strength indicator 224 increase in length as the power levels received from the first base station 104 increase and continue to increase in length as the mobile device 102 approaches the first base station 104.

Alternate handover positions are generated to provide continued connectivity to the communications network 110 in the event of sudden detours or deviations from the path 202. Further handover locations can be identified by the mobile device 102 using positional or location information detected from a base station or received from a base station that can include information from another base station connected to the variety of networks, or combinations thereof.

For illustrative purposes, the mobile device 102 is shown and described detecting or receiving the Rician or the Rayleigh fading channel energy distribution from the movements of the mobile device 102. It is understood that any of the base stations, including the first base station 104 or the second base station 112, can also detect or receive a Rician or the Rayleigh fading channel energy distribution from radiated energy transmitted from the mobile device 102 or a different base station.

In one example, the first base station 104 can detect a dominant peak energy component of a Rician fading channel energy distribution from the second base station 112 and respond by reducing the transmit power radiated from the first base station 104 to prevent cross interference with the second base station 112. In another example, the first base station 104 can detect a reduction of radiated energy from the mobile device 102 and respond by increasing the transmit power radiated from the first base station 104 to improve quality of signal, QOS, to the mobile device 102.

Each mobile device transmits a mobile identifier that is unique from any other mobile identifier within the communications network 110. The mobile identifier is used to identify one mobile device from any other mobile device within the communications network 110.

It has been discovered that the mobile device 102 with no location unit assistance, such as a global position system (GPS), processes the dominant peak energy component within the Rician fading channel energy distribution composed of the Doppler frequencies to provide for the optimum handover using the positional or location information to eliminate any communication interruption.

It has been discovered that the mobile device 102 receiving the Rician fading channel energy distribution from the first base station 104 enables the mobile device 102 having no location unit assistance, such as a global positioning system (GPS), to determine the direction of movement relative to the first base station 104 and to provide the optimum handover for exceptionally clear audio clarity and signal to noise ratios.

It has been discovered that the mobile device 102 receiving the Rician fading channel energy distribution from the first base station 104 enables the mobile device 102 with no location unit assistance, such as a GPS, to determine the direction of movement relative to the second base station 112 and to provide the optimum handover for exceptionally clear audio clarity and signal to noise ratios.

It has been discovered that the mobile device 102 receiving the Rician fading channel energy distribution from the cell tower locations 212 enables the mobile device 102 with no location unit assistance, such as a GPS, to determine the direction of movement and the mobile speed 218 of the mobile device 102 relative to the cell tower locations 212 and results in elimination of any communication interruptions.

It has been discovered that the mobile device 102 detecting the Rician or the Rayleigh fading channel energy distributions from the first base station 104 or the second base station 112 enables the mobile device 102 to provide continuous communication using the wireless connections 106 in the communications network 110 having the signal blocker 210.

It has been discovered that the cell tower locations 212 can receive Rician fading channel energy distributions from the mobile device 102 to adjust the radiated energy power levels from the cell tower locations 212 to optimize power usage by the first base station 104 or of the second base station 112.

It has been discovered that direction estimations of the mobile device 102 using Rician factor or K between base stations and mobile devices provide location estimations absent of any locating assistance unit, including a global positioning system, with minimized circuitry, lower power consumption, and higher reliability for handover events of mobile devices.

It has been discovered that the cell tower locations 212 can receive Rician fading channel energy distributions from the mobile device 102 to adjust the radiated energy power levels from the cell tower locations 212 to eliminate cross-talk or over modulation interference to the mobile device 102 for superior audio clarity within the communications network 110.

Figure 3:
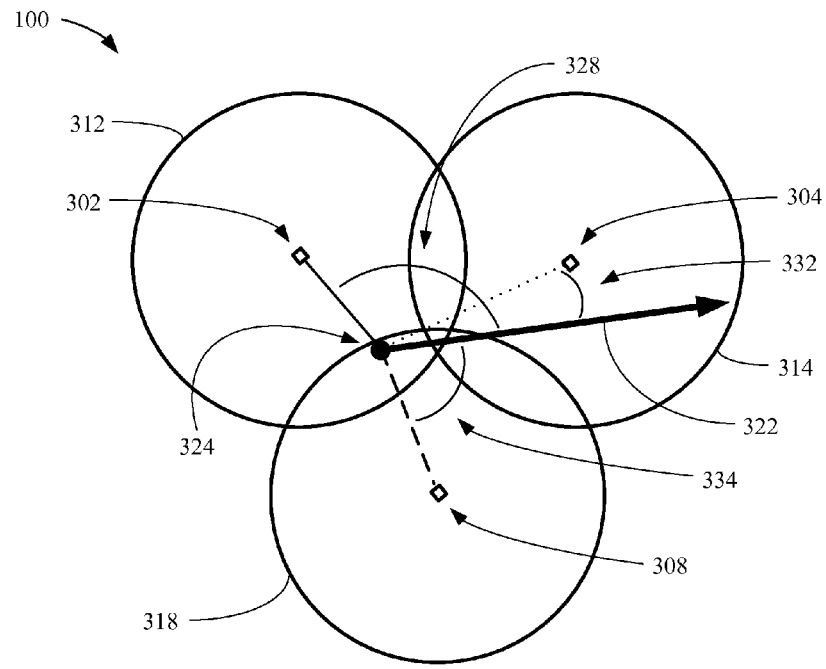
FIG. 3 is a diagram exemplary of power and handovers from the mobile communication system of FIG. 1 with multiple overlapped radiated energy regions.

Referring now to FIG. 3, therein is shown a diagram exemplary of power and handovers from the mobile communication system 100 of FIG. 1 with multiple overlapped radiated energy regions. For illustrative purposes, a first mobile tower structure 302, a second mobile tower structure 304, and a third mobile tower structure 308 are shown forming corners of a triangle. It is understood that the first mobile tower structure 302, the second mobile tower structure 304, and the third mobile tower structure 308 can be positioned differently. For example, the first mobile tower structure 302, the second mobile tower structure 304, and the third mobile tower structure 308 can be positioned along an elliptical shaped path.

The first mobile tower structure 302, the second mobile tower structure 304, and the third mobile tower structure 308 each identify a unique geographic position of a first mobile tower, a second mobile tower, and a third mobile tower, respectively. Also shown are a first radiated energy area 312, a second radiated energy area 314, and a third radiated energy area 318 transmitted from the first mobile tower structure 302, the second mobile tower structure 304, and the third mobile tower structure 308, respectively.

A path 322 beginning at mobile position 324 is shown indicating a route on which the mobile device 102 of FIG. 2 is travelling on. The mobile device 102 moving from the mobile position 324 towards the second radiated energy area 314 receives power radiated from the first mobile tower structure 302 and the third mobile tower structure 308. Amplitudes or amount of the power radiated from the first mobile tower structure 302 and the third mobile tower structure 308 decrease to the mobile device 102 as the mobile device 102 moves towards the second radiated energy area 314.

The amplitude of the power radiated from the first mobile tower structure 302 decreases at a greater rate than the power radiated from the third mobile tower structure 308 as the mobile device 102 moves away from the mobile position 324. Amplitude of power radiated from the second mobile tower structure 304 rapidly increases as the mobile device 102 approaches the second radiated energy area 314.

A mobile intercept angle relative to a mobile tower structure is defined as an angle formed between a line intersecting the mobile tower structure and the antenna 206 of FIG. 2 of the mobile device 102 and a line coincident with a direction of movement of the antenna 206 on a path. A first mobile intercept angle 328 relative the cell tower locations 212 of the first mobile tower structure 302, a second mobile intercept angle 332 relative the cell tower locations 212 of the second mobile tower structure 304, and a third mobile intercept angle 334 relative the cell tower locations 212 of the third mobile tower structure 308 are shown.

The power radiated from the first mobile tower structure 302, the second mobile tower structure 304, and the third mobile tower structure 308, detected by the mobile device 102 can be used to determine if a handover can be avoided or when on a path, where on a path, or to which mobile tower structure should a handover occur. The first mobile intercept angle 328, the second mobile intercept angle 332, or the third mobile intercept angle 334, can also provide additional information to track current direction of the mobile device 102.

It has been discovered that the mobile device 102 can monitor the amplitude or amount of power radiated from the first mobile tower structure 302, the second mobile tower structure 304, or the third mobile tower structure 308 to provide mobile tower structures used to minimize unnecessary handovers by the mobile device 102.

It has been discovered that the first mobile intercept angle 328, the second mobile intercept angle 332, or the third mobile intercept angle 334, as detected and determined by the mobile device 102, provides directional and coordinate information of mobile towers to eliminate unnecessary handovers resulting in simplified circuitry, extended product life, or power savings for the mobile device 102.

It has been discovered that the first mobile intercept angle 328, the second mobile intercept angle 332, or the third mobile intercept angle 334 and the power radiated from the first mobile tower structure 302, the second mobile tower structure 304, or the third mobile tower structure 308, detected and determined by the mobile device 102, eliminates any unnecessary handovers resulting in simplified circuitry, extended product life, and power savings for the mobile device 102.

It has been discovered that the first mobile intercept angle 328, the second mobile intercept angle 332, or the third mobile intercept angle 334, as detected and determined by the mobile device 102 with no location unit assistance, such as a GPS, improves directional tracking of the mobile device 102 and surrounding mobile tower structures resulting error free contiguous handover executions.

Figure 4:
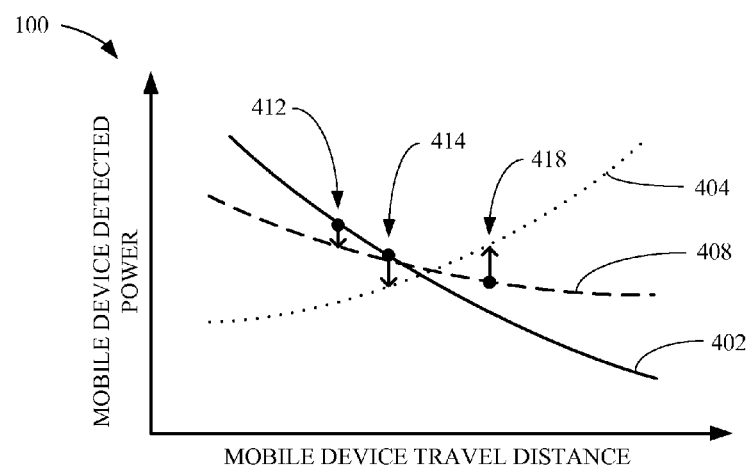
FIG. 4 is a graphical chart of handovers and the multiple overlapped radiated energy regions of FIG. 3.

Referring now to FIG. 4, therein is shown a graphical chart of handovers and the multiple overlapped radiated energy regions of FIG. 3. The graphical chart plots power detected by the mobile device 102 of FIG. 2 on the Y-axis and distance traveled along the path 322 of FIG. 3 on an X-axis. First power curve 402, second power curve 404, and third power curve 408 represent power levels received by the mobile device 102 at various distances from the first mobile tower structure 302 of FIG. 3, the second mobile tower structure 304 of FIG. 3, and the third mobile tower structure 308 of FIG. 3, respectively.

For illustrative purposes, there are three handovers shown and are represented at a first handover position 412, a second handover position 414, and a third handover position 418, corresponding to a first distance, a second distance, and a third distance along the X-axis, respectively. It is understood that there can be any number of handovers. For example, there can be five handovers between the first handover position 412 and the third handover position 418 on the graphical chart.

The mobile device 102 can perform a handover at the first handover position 412, the second handover position 414, the third handover position 418, or any combination thereof. In an embodiment of the present invention, a handover at the first handover position 412 from the first mobile tower structure 302 to the third mobile tower structure 308 could occur as a result of the mobile device 102 detecting power levels indicated by the first power curve 402 decreasing at a rate faster than power levels indicated by the third power curve 408.

The mobile device 102 can remain coupled to the third mobile tower structure 308 and perform a handover at the third handover position 418. The handover at the third handover position 418 can be result of the mobile device 102 detecting power levels of the second power curve 404 increasing as the power levels of the third power curve 408 continues decreasing.

In another embodiment of the present invention, instead of executing the handovers at the first handover position 412 and the third handover position 418, the mobile device 102 could travel further while coupled to the first mobile tower structure 302 before performing the handover at the second handover position 414. The power levels indicated by the first power curve 402 at the second handover position 414 decreases at a rate faster than increasing rates of the power levels indicated by the second power curve 404.

Figure 5:
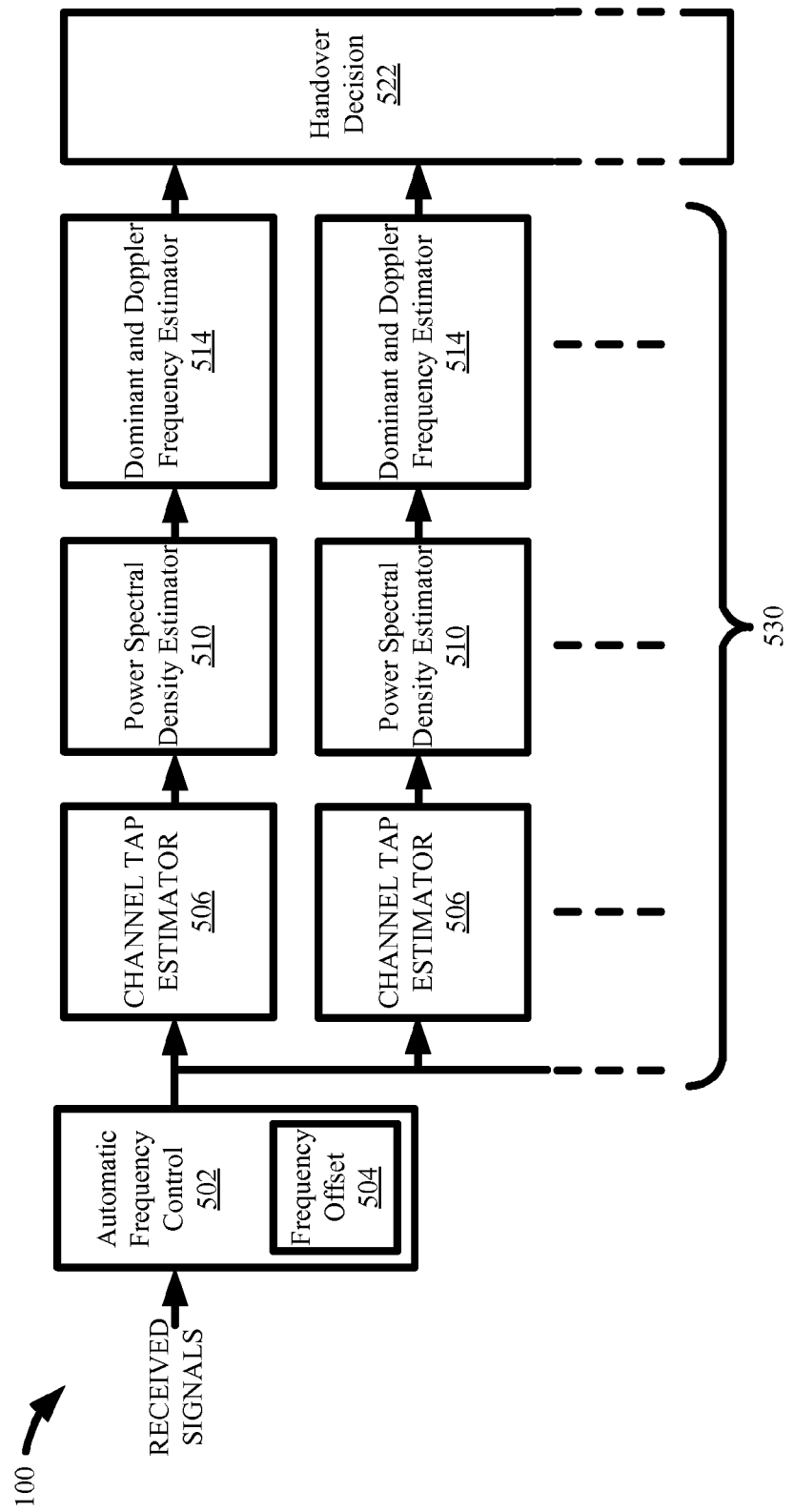
FIG. 5 is an exemplary block diagram of a portion of the mobile device of FIG. 2 used to perform handovers in the mobile communication system of FIG. 2.

Referring now to FIG. 5, therein is shown an exemplary block diagram of a portion of the mobile device 102 of FIG. 2 used to perform handovers in the mobile communication system 100 of FIG. 2. The block diagram includes an automatic frequency control module 502, channel tap estimator modules 506, power spectral density estimator modules 510, dominant and Doppler frequency estimator modules 514, and a handover decision module 522.

For purposes of discussion, the block diagram shown and described as a part of the mobile device 102 of FIG. 1. It is understood that one or more of the functional blocks can be incorporated outside of the mobile device 102. For example, a portion of the handover decision module 522 can be incorporated in a base station in a communications network or distributed within the communications network, such as among different base stations.

The automatic frequency control module 502 detects changes in frequency, such as a frequency offset 504 value or wavelength, between each of the signals received by the mobile device 102 and an internal reference clock within the mobile device 102. The detected changes in frequency of each of the received signals can be adjusted or corrected using timing offsets to match the internal reference clock and to create an adjusted frequency reference for receiving signals using automatic frequency control (AFC) circuitry.

The adjusted frequency reference from each of the received signals is sent to one of many processing channels 530. Each of the processing channels 530 captures time based signals from either the first base station 104 of FIG. 2, the second base station 112 of FIG. 2, or a different base station similar to the first base station 104 or the second base station 112 using the adjusted frequency reference.

For purposes of illustration, there are two of the processing channels 530 shown. It is understood that there can be any number of the processing channels 530. For example, there can be seven processing channels 503.

The channel tap estimator modules 506 of each one of the processing channels 530 receives the adjusted frequency reference and the frequency offset 504. Each of the channel tap estimator modules can filter and extract multiple input time based samples from the processing channels 530 for signal amplitude, the cell identifier of a specific base station from the automatic frequency control module 502, and to generate a signal profile of the time based signals associated with the one of the processing channels 530.

The signal profile can include the cell identifier, the frequency offset 504, a record of an arrival time of the signals, indication of a dominating signal peak, a bandwidth spread having one or multiple signal peaks greater than a pre-defined threshold amplitude, a total number of input samples received, or an existence of multiple signal peaks having similar signal peak amplitudes. The signal profile is used to determine or detect a dominant peak with a Doppler bandwidth spread or a dominant peak with little or no Doppler bandwidth spread.

The signal profile can also be used to determine or detect a Doppler bandwidth spread with no dominant peak or multiple peaks with similar power peaks and no bandwidth spread based on user defined pre-determined amplitude thresholds. The channel tap estimator modules 506 can convert the time based signals from a time base to a frequency base domain using a Fourier transform technique (FFT) that can include a discrete Fourier or Fast Fourier transform algorithm.

The channel tap estimator modules 506 can transmit the frequency domain based samples of the signal profile, the adjusted signal, or the multiple input signal samples to the power spectral density estimator modules 510. The power spectral density estimator modules 510 detects and determines a spectral profile based on the frequency domain based samples from the channel tap estimator modules 506. The spectral profile includes the frequency spread values of any bandwidth spreads identified in the signal profile from the channel tap estimator modules 506 and slope or edge rate transitions at frequency roll-offs of the bandwidth spreads.

The dominant and Doppler frequency estimator modules 514 receives the spectral profile from the power spectral density estimator modules 510. The FFT is described as a function of the channel tap estimator modules 506. The dominant and Doppler frequency Estimator modules 514 determine or measure the Doppler frequency from the power spectral density or the dominant peak frequency from the adjusted signal, the spectral profile, and the signal profile, or a combination thereof.

It is understood that the FFT can be implemented differently. The FFT can be implemented as a function of the channel tap estimator modules 506, the dominant and Doppler frequency estimator modules 514, or a combination thereof. For example, the FFT could be implemented entirely in the dominant and Doppler frequency estimator modules 514.

The dominant and Doppler frequency estimator modules 514 determines either the Doppler frequency the bandwidth spread, the line-of-sight frequency (LOS frequency) of the dominant frequency peak within a Doppler bandwidth spread, or a line-of-sight frequency within a bandwidth spread of a Rayleigh component lacking any Doppler bandwidth spread to the handover decision module 522. The dominant and Doppler frequency estimator modules 514 sends the Doppler frequency, the LOS frequency within the Doppler bandwidth spread, or the LOS frequency without any Doppler bandwidth spread, and the cell identifier to the handover decision module 522.

The handover decision module 522 processes the information from each of the processing channels 530 that includes the Doppler frequency, the LOS frequency within the Doppler bandwidth spread, or the LOS frequency without any Doppler bandwidth spread, and the cell identifier and determines if a handover will be needed. If a handover is needed, the handover decision module 522 indicates to the mobile device 102 the next base station to couple to and when the handover is to occur.

Figure 6:
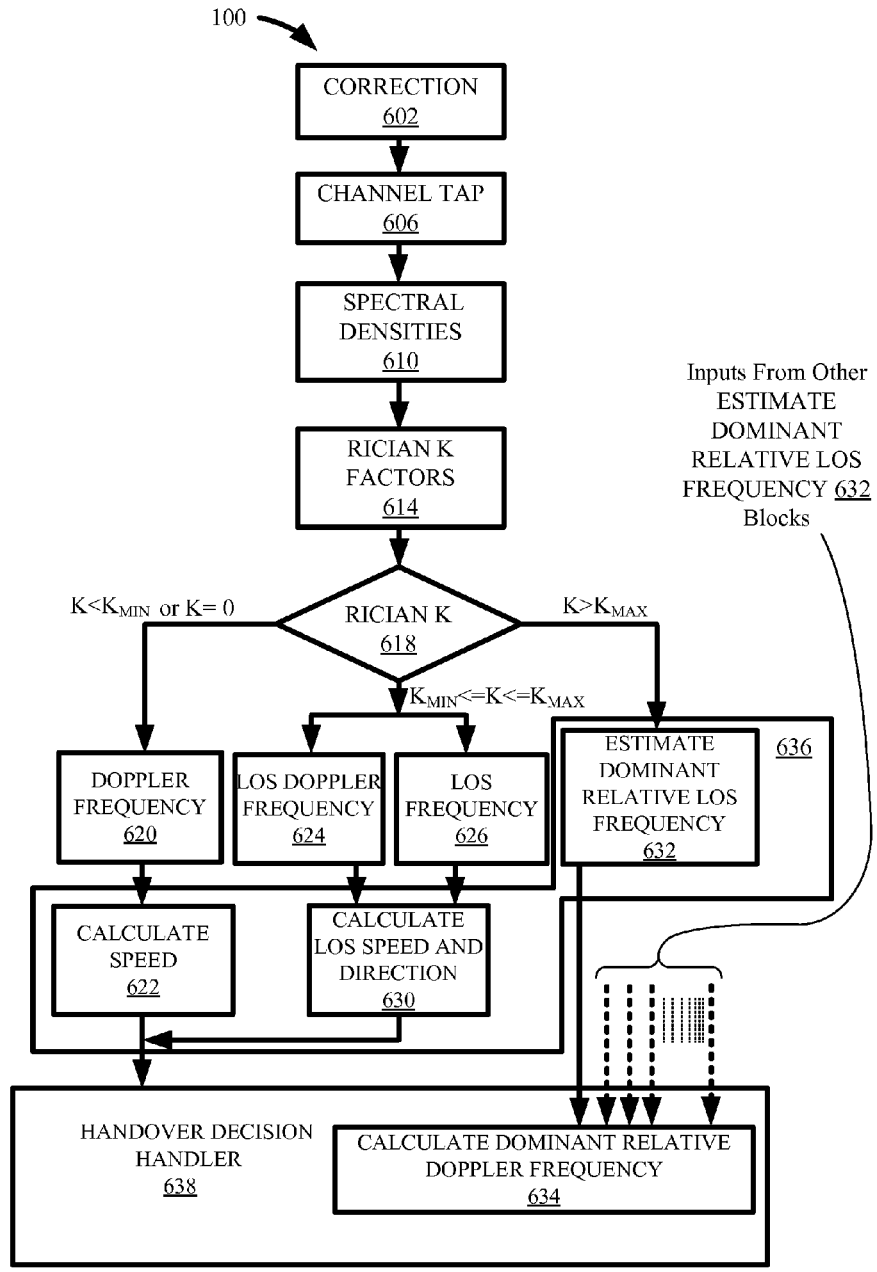
FIG. 6 is an exemplary detailed control flow diagram for handovers in the mobile communication system of FIG. 2.

Referring now to FIG. 6, therein is shown an exemplary detail control flow diagram for handovers in the mobile communication system 100 of FIG. 2. The exemplary flow chart shows tasks used to perform handovers.

Signals received by the mobile device 102 of FIG. 1 are re-adjusted to track a local reference signal of the mobile device 102 in frequency correction 602 modules. The frequency correction 602 modules aligns the received signals from different base stations to permit relative analysis and calculations.

Estimate channel tap 606 modules process the signal information re-adjusted with the frequency offset 504 of FIG. 5 by the frequency correction 602 modules from the cell tower locations 212 of FIG. 2. Each of the estimate channel tap 606 modules filter, extract, and count each sample of the signals from the base carrier frequency signal 108 of FIG. 1 from one of the base stations, which contain both Rayleigh or LOS factors, describes the received Rician signal in a Rician frequency-flat fading channel represented by the following equation:

$$y(t) = \sqrt{\frac{P}{K+1}} h(t) + \sqrt{\frac{KP}{K+1}} \exp(j2\pi f_D \cos(\theta)t + \psi) + n(t)$$

where h(t) and n(t) represent the Rayleigh-distributed random diffuse component and the complex Gaussian random noise, respectively. The second term represents the deterministic line-of-sight (LOS) component. P is the received signal power, K is the Rician factor which is the power ratio of LOS component to Rayleigh component θ is the angle of arrival between a direction or the mobile intercept angle of the mobile device 102 and a cell tower, ψ is the phase of the LOS component, $f_D = v/\lambda = vf_c/c$ is the Doppler frequency, v is the speed of the mobile device 102, λ is the wavelength, $f_c$ is the carrier frequency, and c is the speed of light.

Estimate power spectral densities 610 modules to generate or estimate at least one PSD from the received signal samples of the Rician frequency-flat fading channel received by the mobile device 102 from the base carrier frequency signal 108 and converted to frequency domain. An estimated bandwidth spread of the PSD for each channel can be analyzed to provide measured Doppler frequencies. The estimated bandwidth spread of the PSD with the frequency offset 504 can be analyzed to provide LOS frequencies.

Measure Rician K factors 614 modules estimates the Rician K factor of transmissions received by the mobile device 102 from the power spectral densities 610 of and indicative of the cell tower locations 212 of FIG. 2. The measure Rician K factors 614 modules can also estimate the power magnitudes 214 of the radiated energy from the cell tower locations 212. The Rician K factor, for example, can be estimated using the expression of a received signal in a Rician frequency-flat fading channel (described earlier) and the following Rician K equation:

$$K \approx \frac{\int_{f \in BW_{LOS}} PSD(f) df}{\int_{f \in BW_{DOP}} PSD(f) df - \int_{f \in BW_{LOS}} PSD df}$$

where $BW_{DOP}$ and $BW_{LOS}$ are the frequency set of Doppler spread and LOS peak power, respectively.

Rician K Decision 618 modules determine K factor characteristics of any PSD. The K factor characteristics are defined as a PSD having a K factor that is too weak, too strong, neither too weak and too strong, or equal to zero. The K factor characteristics of the PSD is used to select the method of handover processing. A Rician fading channel is too weak when K<Kmin. A Rician fading channel is too strong when K>Kmax. A Rician fading channel is neither too weak and too strong when Kmin<=K<=Kmax. A K factor equal to zero is a Rayleigh fading channel and does not have a LOS peak power component. The Rician K equation can be used to estimate the Rician K factor before the Doppler or the LOS frequency are calculated or measured using the Rician K equation described above.

The values of Kmin and Kmax are pre-specified. Kmin is defined as minimum K value specified by a specific PSD implemented architecture, hardware, software, operating conditions, or combination thereof, in order to determine the LOS frequencies or the peak components of the PSD. Kmax is defined as the maximum K value specified by the specific PSD implemented architecture, hardware, software, operating condition, or combination thereof, in order to determine the Doppler frequency or the bandwidth spread component of the PSD. The specific PSD implemented architecture, hardware, software, operating condition, or combination thereof is optimized for a value of K between Kmin and Kmax to determine both Doppler frequencies and LOS frequencies.

Estimate Doppler frequency 620 modules determines the Doppler frequency when K<Kmin or K=zero. For example, the Doppler frequency can be determined using the following relationship of:

$$f_D = (f_{D,max} - f_{D,min})/2$$

where $f_{D,max}$ and $f_{D,min}$ are the maximum and minimum frequencies of Doppler spread.

Calculate speed 622 modules determines the speed of the mobile device 102 when K<Kmin. For example, the speed of the mobile device 102 can be determined or calculated using the following relationship of:

$$v = cf_D/f_c$$

where c equals the speed of light, $f_c$ equals the carrier frequency from the cell tower locations 212, and $f_D$ equals the Doppler frequency from the estimate Doppler frequency 620 modules.

Estimate LOS Doppler frequency 624 modules determine Doppler frequencies when Kmin<=K<=Kmax based on the PSD of the power spectral densities 610 module. For example, the Doppler frequencies can be determined using the following relationship of:

$$f_D = (f_{D,max} - f_{D,min})/2$$

where $f_D$ is the Doppler frequency, $f_{D,max}$ and $f_{D,min}$ are the respective maximum and minimum frequencies of Doppler spread.

LOS frequency 626 modules determine LOS frequencies when Kmin<=K<=Kmax. For example, the LOS frequencies can be determined using the following relationship of:

$$f_L = f_{max} - f_O$$

where $f_L$ is the LOS frequency, $f_{max}$ is the frequency of the maximum PSD, and $(f_{D,max} + f_{D,min})/2 = f_O$, the frequency offset 504.

Calculate LOS speed and direction 630 modules determine the speed and direction of the mobile device 102. For example, the speed and direction of the mobile device 102 can be determined or calculated using the following relationships of:

$$v = cf_D/f_c, \theta = \cos^{-1}(f_L/f_D)$$

where c equals the speed of light, $f_c$ equals the carrier frequency from the cell tower locations 212, $f_D$ equals the Doppler frequency from the estimate Doppler frequency 620 modules, and θ is the angle of arrival or the mobile intercept angle between the direction of the mobile device 102 and one of the cell tower locations 212. The Doppler and the LOS frequencies are from the estimate LOS Doppler frequency 624 modules and the LOS frequency 626 modules, respectively based on the power spectral densities 610 from the base carrier frequency signal 108 received by the mobile device 102.

Estimate dominant relative LOS frequency 632 modules determines a relative LOS frequency when K>Kmax. When $K>K_{max}$, it is difficult to measure the bandwidth spread caused by Rayleigh component, so the Doppler frequency cannot be estimated. Calculate dominant relative Doppler frequency 634 module determines the relative LOS Doppler frequency received by the mobile device 102 from pairs of the cell tower locations 212 using the maximum PSD from each of the cell tower locations 212 or cell i, $f_{max}^{(i)}$. For example, since $f_{max} = f_L + f_O$, and $f_L = f_O \cos(6)$, the dominant relative LOS Doppler frequency 632 can be defined using the following relative LOS Doppler expression of:

$$f_{RL}^{(i,j)} = (f_{max}^{(i)} - f_{max}^{(j)})/2 = f_{MAXij-RD}(\cos(\theta_i) - \cos(\theta_j))/2$$

where $f_{RD}(i,j)$, $f_{max(i)}$, $f_{max(i)}$, $f_D$, θi, and θj, equals to the dominant relative LOS Doppler frequency 632 detected by the mobile device 102 from the signal power of a base station i relative to the signal power of a different base station j, frequency at the maximum PSD of the base station i, frequency at the maximum PSD of the base station j, an approximated peak LOS Doppler frequency, an angle of arrival from the base station i, and an angle of arrival from the base station j, respectively.

The dominant relative LOS Doppler frequency 632 can be calculated or estimated based on the power spectral densities 610 of the base carrier frequency signal 108 from each of the cell tower locations 212.

The polarity of the dominant relative LOS Doppler frequency 632 indicates a direction of the mobile device 102 relative to cell i and cell j. The dominant relative LOS Doppler frequency 632 having positive polarity or value indicates that the mobile device 102 is moving from cell j to cell i. The dominant relative LOS Doppler frequency 632 having a negative polarity or value indicates that the mobile device 102 is moving in a direction away from cell i towards cell j.

A numeric magnitude of the dominant relative LOS Doppler frequency 632 indicates the rate of change of the relative power level between a pair of two cells. A large positive number indicates that a signal power from cell i will increase rapidly compared to a signal power level from cell j since the mobile device 102 is moving faster towards cell i than from cell j.

The numeric magnitude can be used to predict the trend in signal power levels received by the mobile device 102 from multiple target base stations or cells for handovers. For example, the mobile device 102 can be in need of a handover, currently connected or coupled to cell 1, such as the first mobile tower structure 302 of FIG. 3, and approaching cell 2 cell 3, such as the second mobile tower structure 304 of FIG. 3 and the third mobile tower structure 306 of FIG. 3, respectively.

The mobile device 102 can detect and receive the dominant relative LOS Doppler frequency 632 of $f_{FD}^{(2,1)}$ and $f_{RD}^{(3,1)}$ from the cell 2 with respect to the cell 1 and the cell 3 with respect to the cell 1, respectively. The mobile device 102 can determine that $f_{RD}^{(2,1)} > f_{RD}^{(3,1)}$, indicating that signal power levels detected from the cell 2 will increase at a rate faster than signal power levels detected from the cell 3, even though power levels transmitted from the cell 3 may be higher than power levels transmitted from the cell 2. With $f_{RD}^{(2,1)} > f_{RD}^{(3,1)}$, the mobile device 102 can choose the handover from the cell 1 to the cell 2.

The dominant relative LOS Doppler frequency 632 defined above can show or determine a relative rate of change in polarity and directions of the power magnitudes 214 of FIG. 2 received by the mobile device 102 movement relative to cell pairs, such as cell j and cell i. When $j_{RD}^{(i,j)}$ is large positive value increasing at a faster rate than $f_{RD}^{(h,j)}$, the power magnitudes 214 of the signal power from cell i is growing at a faster rate than the signal power from cell h indicating cell i can be a preferred next cell to switch or handover to.

When $f_{RD}^{(h,j)}$ is large positive value increasing at a faster rate than $f_{RD}^{(i,j)}$, the power magnitudes 214 of the signal power from cell h is growing at a faster rate than the signal power from cell i, indicating that cell j can be a preferred next cell to switch or handover to. Also, when $f_{RD}^{(i,j)}$ is a positive value and $f_{RD}^{(h,j)}$ is a negative value, the power magnitudes 214 of the signal power from cell i stronger than the signal power from cell h indicating that cell i can be a preferred next cell to switch or handover to.

The dominant relative LOS Doppler frequency 632 is a function of received power magnitudes received by the mobile device 102 and can be independent of geographical proximity of cells to the mobile device 102. The magnitudes and polarities of the relative Doppler frequency can be due to the effects of one or a plurality of the signal blocker 210 of FIG. 2 within the communications network 110. The approximated peak LOS Doppler frequency, $f_{MAXij-RD}$, of the power spectral densities 610 from pairs of the cell tower locations 212 can be calculated or estimated by the mobile device 102.

The approximated peak LOS Doppler frequency can be approximately equal to the maximum absolute values of a plurality of the dominant relative LOS Doppler frequency 632 from the pairs of the cell tower locations 212. The approximated peak LOS Doppler frequency, $f_{MAXij-RD}$, can be expressed as:

$$f_{MAXij-RD} \approx \max(|f_{RD}^{(i,j)}|)$$

The mobile device 102 can schedule or execute the handover event, such as immediate, timed, or a conditional handover execution when changing from a currently coupled cell to coupling to a different cell by using the approximate Doppler frequency magnitude. The approximate Doppler frequency magnitude is indicative of movements of the mobile device 102 relative to available target cells for handover coupling.

Moreover, if there are many cells, an approximate Doppler frequency magnitude can be estimated by choosing the maximum value among the relative frequencies. The approximated Doppler frequency, for example, can be defined using the following relationship of:

For illustrative purposes, the calculate dominant relative Doppler frequency 634 module is shown in a handover decision handler 638 module. The calculate dominant relative Doppler frequency 634 module, can be functionally included in, a part of, or completely external to the handover decision handler 638 module. For example, a functional portion of the calculate dominant relative Doppler frequency 634 module can be included or implemented in the dominant relative LOS Doppler frequency 632 modules.

The calculate dominant relative Doppler frequency 634 module can also each receive or calculate the angle of arrival from the base station j and the frequency at the maximum PSD of the base station j to derive the relative Doppler frequency described above. Similarly, another of the calculate dominant relative Doppler frequency 634 module can also be used to determine a different relative Doppler frequency having different angle of arrival from the base station i and the frequency at the maximum PSD of the base station i.

The estimate Doppler frequency 620 modules, the estimate LOS Doppler frequency 624 modules, the LOS frequency 626 modules, and the dominant relative LOS Doppler frequency 632 modules can be referred to as estimator modules. The calculate speed 622 modules, the calculate LOS speed and direction 630 modules, and the dominant relative LOS Doppler frequency 632 modules can be referred to as a calculator module 636.

The handover decision handler 638 module can be activated to accumulate or store outputs from the calculator module 636. Activation of the handover decision handler 638 module evaluates or determines if the mobile device 102 is to perform a handover based on the cell tower locations 212, the dominant relative LOS Doppler frequency 632, the approximated peak LOS Doppler frequency, the power magnitudes 214 of FIG. 2, or any combination thereof.

The handover decision handler 638 module evaluates or determines to which base station and schedules when or where to execute the handover based on information received from the estimator modules, the calculator modules, or any combination thereof. The outputs to the handover decision handler 638 module can include Doppler frequencies, LOS frequencies, current mobile speed, relative mobile speed, relative Doppler frequencies, signal power densities including LOS, spectral, or peak power densities, or any combination thereof.

The physical transformation of identifiers for the handover decision handler 638, the dominant relative LOS Doppler frequency 632, the calculate dominant relative Doppler frequency 634, the calculate LOS speed and direction 630, the LOS frequency 626, the estimate LOS Doppler frequency 624, the calculate speed 622, or the estimate Doppler frequency 620 results in movement in the physical world, such as the signal strength indicator 224, based on the operation of the mobile communication system 100. As the movement in the physical world occurs, the movement itself creates additional information that is converted back to the identifiers for the handover decision handler 638, the dominant relative LOS Doppler frequency 632, the calculate dominant relative Doppler frequency 634, the calculate LOS speed and direction 630, the LOS frequency 626, the estimate LOS Doppler frequency 624, the calculate speed 622, or the estimate Doppler frequency 620 for continued operation of the mobile communication system 100 and to continue the movement of the signal strength indicator 224 in the physical world.

It has been discovered the mobile device 102 receiving two or more Rician fading channels can determine the relative Doppler frequency to determine changing rates and direction of arrival of the relative power spectral density peaks from the channels to eliminate any communication interruption.

It has been discovered the mobile device 102 receiving two or more Rician fading channels, independent of any power spectral density bandwidth frequency spreads, can determine the relative Doppler frequency using relative signal power comparisons between cell tower pairs to determine speed and direction of the mobile device 102 relative to each of the cell tower locations to prevent any communication interruptions.

It has been discovered that using the Rician K equation to estimate the Rician K factor before processing, calculating, or measuring of the Doppler or LOS frequencies results in improved accuracy, convergence, and efficiency by streamlining the firmware or hardware implementation for handover events.

Figure 7:
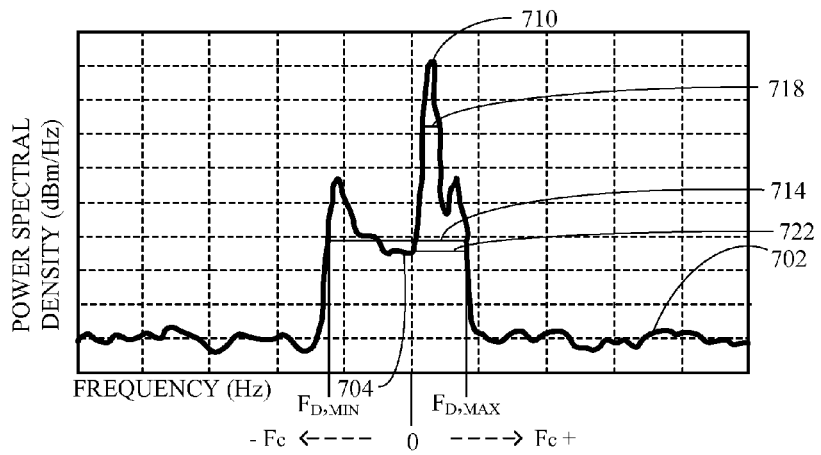
FIG. 7 is a graphical plot exemplifying a power spectral density of a Rician fading channel with K between Kmin and Kmax.

Referring now to FIG. 7, therein is shown a graphical plot exemplifying a power spectral density graph of a Rician fading channel with K between Kmin and Kmax. The graph can include a vertical axis representing received power per frequencies generating a mixed/harmonic and a horizontal axis representing frequency that show frequency changes relative to zero Hertz as detected or perceived by a mobile device. The vertical axis can be partitioned into units of decibels per Hertz and the horizontal axis can be partitioned into units of Hertz.

A power spectral density curve 702 is shown, determined from the base carrier frequency signal 108 of FIG. 1, having a non-zero frequency offset 704 at a frequency of Fo. The frequency of Fo can be defined as:

$$f_O = (f_{D,max} + f_{D,min})/2$$

with a maximum Doppler frequency of $f_{D,max}$ and a minimum Doppler frequency of $f_{D,min}$.

A frequency of maximum peak PSD 710 having a value of $f_{max}$ is shown and used to calculate the LOS frequency of $f_L$, using the equation of:

$$f_L = f_{max} - f_O$$

where $f_O$ is the non-zero frequency offset 704. A bandwidth of the Doppler spread, $BW_{DOP}$, represented by a first line segment 714, indicates the set of frequencies of the Doppler spread. A bandwidth of the LOS peak power or dominant power, $BW_{LOS}$, represented by a second line segment 718, indicates the set of frequencies of the LOS peak power spread. The Doppler frequency $f_D$, can be represented by a calculated Doppler Frequency 722, using the equation of:

$$f_D = (f_{D,max} - f_{D,min})/2$$

For example, the power spectral density curve 702 can include a PSD shifted to a negative frequency by the AFC to compensate for the LOS component, a Doppler frequency $f_D$ of one hundred Hertz, a Rician K of negative six decibels, and an angle of arrival θ of sixty degrees results in a LOS frequency of fifty Hertz. It is understood that when the channel is Rician, not only the Doppler frequency $f_D$, but also the LOS frequency $f_L = f_D \cos(\theta)$ can be measured by finding the frequency of maximum peak of the PSD.

Figure 8:
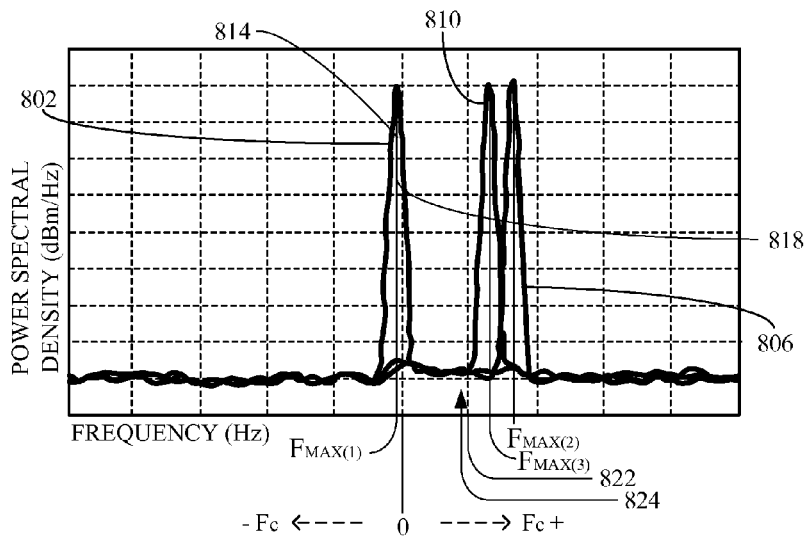
FIG. 8 is a graphical plot exemplifying power spectral densities of three Rician fading channels with K greater than Kmax.

Referring now to FIG. 8, therein is shown a graphical plot exemplifying power spectral densities of three Rician fading channels with K greater than Kmax. The graph can include a vertical axis representing received power per frequencies generating a mixed/harmonic and a horizontal axis representing frequency that show frequency changes relative to zero Hertz as detected or perceived by a mobile device. The vertical axis can be partitioned into units of decibels per Hertz and the horizontal axis can be partitioned into units of Hertz.

Shown are a first curve 802 of a first power spectral density, a second curve 806 of a second power spectral density, and a third curve 810 of third power spectral density, each curve represents power received by a mobile device from a first base station, a second base station, and a third base station, respectively. When K is greater than Kmax, little or no bandwidth spread is detected by the mobile device and Doppler frequencies cannot be estimated.

The speed of the power and angle of arrival from one base station compared to another base station can be used to calculate the dominant relative LOS Doppler frequency 632 using the relative LOS Doppler expression of:

$$f_{RD}^{(i,j)} = (f_{max}^{(i)} - f_{max}^{(j)})/2 - f_{MAXij\text{-}RD}(\cos(\theta_i) - \cos(\theta_j))/2$$

The $f_{RD}^{(i,j)}$ value greater than any other $f_{RD}^{(i,j)}$ value determined from all of the power spectral density curves, from different base carrier signals, can be combined to determine the approximated peak LOS Doppler frequency, $f_{MAXij=RD}$, used in the above expression and expressed as:

$$f_{MAXij\text{-}RD} = \max(|f_{Rd}^{(i,j)}|)$$

The greater number of values of $f_{RD}^{(i,j)}$, the greater the accuracy of approximated peak LOS Doppler frequency, $f_{MAXij\text{-}RD}$. The approximated peak LOS Doppler frequency, $f_{MAXij\text{-}RD}$, can also be referred to as an estimated relative LOS Doppler frequency.

For example, for a K of ten decibels, a $\theta_1$ for the first curve 802 of one hundred fifty degrees, a $\theta_2$ for the second curve 806 of thirty degrees, a $\theta_3$ for the third curve 810 of sixty degrees, a negative eight Hertz for $F_{max(1)}$ of the first curve 802, one hundred and sixty-five Hertz for $F_{max(2)}$ of the second curve 806, and to one hundred and twenty-eight Hertz for $F_{max(3)}$ of the third curve 810 equal, the relative Doppler frequencies of the second curve 806 to the first curve 802 and the third curve 810 to the first curve 802 can be determined.

The relative Doppler frequency $f_{RD}^{(2,1)}$ from the second curve 806 to the first curve 802 can be determined to be eighty six point five Hertz and the relative Doppler frequency $f_{RD}^{(3,1)}$ from the third curve 810 to the first curve 802 can be determined to be sixty eight Hertz using the expression for $f_{Rd}^{(i,j)}$. Using the expression for $f_{MAXij\text{-}RD}$, the approximated peak LOS Doppler frequency is eighty six point five Hertz, the larger of the two relative Doppler frequencies previously mentioned. A first relative Doppler frequency 814 is shown representing the magnitude of the relative Doppler frequency from the second curve 806 to the first curve 802 multiplied by two. A second relative Doppler frequency 818 is shown representing the magnitude of the relative Doppler frequency from the third curve 810 to the first curve 802 multiplied by two.

In this example, for purposes of comparison, the actual peak LOS Doppler frequency 822 is shown at one hundred Hertz, versus the eighty six point five Hertz approximated value of $f_{MAXij-RD}$. The approximated peak LOS Doppler frequency, $f_{MAXij-RD}$, is shown and can be referred to as an estimated peak Doppler frequency 824.

It has been discovered that the dominant peak frequency of multiple Rician fading channels provide both estimations of speed or velocity and direction of movement of the mobile device 102 from relative arrival frequencies of dominant energy peaks from multiple cell tower locations detected by the mobile device 102 to provide enhanced handover accuracy and timing.

Figure 9:
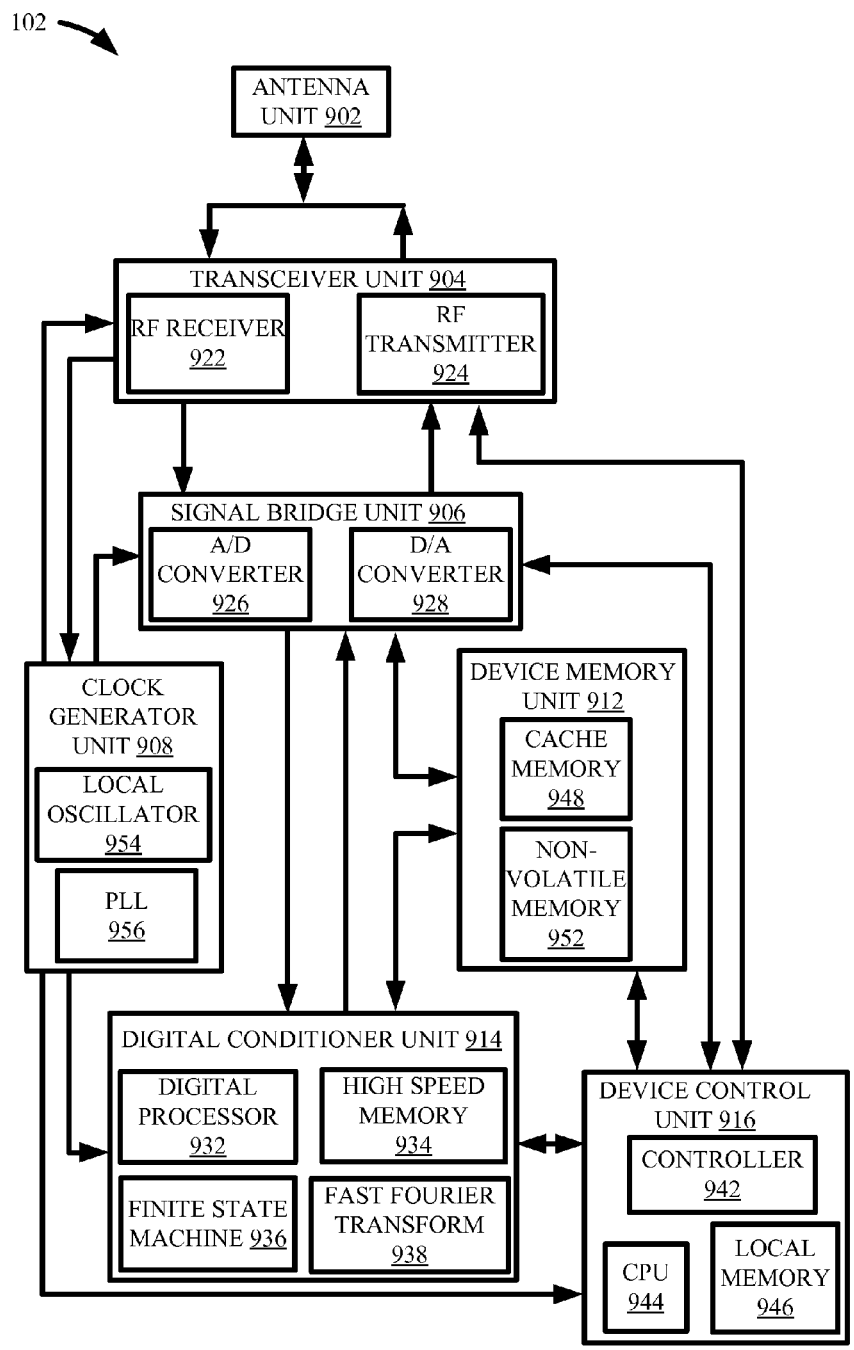
FIG. 9 is a hardware block diagram of the mobile device.

Referring now to FIG. 9, therein is shown a hardware block diagram of the mobile device 102. Shown are function units of the mobile device 102. The functional unit is defined as hardware, software, or a combination thereof that can be used to perform various functions, tasks, calculations, or results necessary for the operation of the present invention. The functional units of the mobile device 102 of FIG. 2 can include an antenna unit 902, a transceiver unit 904, a signal bridge unit 906, a clock generator unit 908, a device memory unit 912, a digital conditioner unit 914, and a device control unit 916.

The antenna unit 902 can be formed of a conductive material capable of radiating electromagnetic (EM) energy from current flow within the conductive material or receiving radiated electromagnetic energy as a current flow within the conductive material. The antenna unit 902 can be formed an integral unit or as separate sub-units such as a sub-unit to radiate EM energy and another sub-unit to receive radiated EM energy. The antenna unit 902 can connect to the transceiver unit 904 to enable reception of the base carrier frequency signal 108 of FIG. 1.

The transceiver unit 904 can include a RF receiver 922 or radio frequency receiver and a RF transmitter 924 or radio frequency transmitter functional unit. The RF receiver 922 receives current from the antenna unit 902 and generates incoming analog signal representation from the current and forwards incoming analog signals to the signal bridge unit 906 for further processing. The RF receiver 922 and the antenna unit 902 can be used to determine the first mobile intercept angle 328 of FIG. 3 of the mobile device 102 of FIG. 2.

The RF transmitter 924 receives outgoing analog signals from the signal bridge unit 906 and generates current to the antenna unit 902. The signal bridge unit 906 is used to convert between digital representations of signals and analog representations of signals. The signal bridge unit 906 can also read information from or write information to the device memory unit 912.

The signal bridge unit 906 can include an A/D converter 926 or analog to digital converter and a D/A converter 928 or digital to analog converter functional unit. The A/D converter 926 of the signal bridge unit 906 can be used to count samples of the base carrier frequency signal 108 of FIG. 1 and include the estimate channel tap 606 of FIG. 6 to generate the power spectral densities 610.

The A/D converter 926 receives analog signals from the RF receiver 922 and sends digital representations of the analog signals to the digital conditioner unit 914. The estimation of the LOS frequency 626 can be provided by the A/D converter 926 and based on the power spectral densities 610. The D/A converter 928 receives digital signals from the digital conditioner unit 914 and sends analog representations of the signals to the RF transmitter 924.

The digital conditioner unit 914 can include a digital signal processor 932, a high speed memory 934, a finite state machine 936, and a fast Fourier transform 938 functional units. The digital conditioner unit 914 can also read information from or write information to the device memory unit 912. The digital signal processor 932 commands and controls operations between the digital signal processor 932, the high speed memory 934, the finite state machine 936, and the fast Fourier transform 938. The digital signal processor 932 can be used to determine the power magnitudes 214 of FIG. 2 of each of the power spectral densities 610 of FIG. 6.

The digital conditioner unit 914, the digital signal processor 932, the high speed memory 934, the finite state machine 936, or the fast Fourier transform 938 can be used to generate the power spectral densities 610 of FIG. 6 from the base carrier frequency signal 108 of FIG. 1 or from circuitry of the measure Rician K factors 614 of FIG. 6.

The finite state machine 936 assists the digital signal processor 932 with repetitive operations, specific complex operations, or complex calculations within the digital conditioner unit 914 to free up bandwidth for the digital signal processor 932. Further, the finite state machine 936 can be used to calculate or determine the estimate LOS Doppler frequency 624 of FIG. 6 based on the power spectral densities 610. The fast Fourier transform 938 can be used to quickly perform algorithm based computations to convert time domain based signals to frequency domain based signals.

The high speed memory 934 is memory specifically designed to allow fast access by the digital signal processor 932, the finite state machine 936, and the fast Fourier transform 938. The digital signal processor 932 performs additional operations and calculations not performed by the finite state machine 936 in parallel with the functions handled by the finite state machine 936. The digital signal processor 932 directly interfaces and manages interface communications with the signal bridge unit 906 and communications with the device control unit 916.

The digital conditioner unit 914 sends or receives information such as intermediate, partial, or resultant parameters or calculations to or from the device control unit 916, respectively. The device control unit 916 interfaces, controls, monitors, and manages the digital conditioner unit 914, the signal bridge unit 906, the transceiver unit 904, and the clock generator unit 908.

The device control unit 916 communicates directly with the handover decision handler 638 of FIG. 6 to activate, enable, disable, or override operations of the handover decision handler 638. The device control unit 916 can also read information from or write information to the device memory unit 912.

The device control unit 916 can include a controller 942, a CPU 944 or central processor unit, and local memory 946 functional unit. The CPU 944 performs arithmetic and controls diagnostic, monitors, exception handling, and support of overall operations of the present invention. The CPU 944 can provide additional processing power for the mobile device 102 and be used to determine, locate, and track the cell tower locations 212 of FIG. 2 based on processes of the measure Rician K factors 614.

The local memory 946 is dedicated for usage by the CPU 944 for purpose such as firmware, temporary storage of intermediate information, or data frequently used exclusively by the CPU 944. The controller 942 manages, monitors, and controls information to and from the device control unit 916 and the CPU 944.

The device memory unit 912 is commonly shared memory used to store information from and send information to the transceiver unit 904, the signal bridge unit 906, the digital conditioner unit 914, and the device control unit 916. The information within the device memory unit 912 includes provisions to share common information between multiple functional units and to provide interlock indications to prevent corruption the common information.

The device memory unit 912 can include a cache memory 948 and a non-volatile memory 952 function units. The cache memory 948 is temporary storage that is only used during the operational periods of the present invention. The non-volatile memory 952 is permanent storage that is needed during and between operational periods of the present invention such as when the mobile device 102 is powered off or has no active power source available.

The clock generator unit 908 generates clocks to the functional units such as the transceiver unit 904, the signal bridge unit 906, the digital conditioner unit 914, the device control unit 916, or any other functional unit within the mobile device 102. The clock generator unit 908 can include a local oscillator 954 and a PLL 956 or phase locked loop functional unit.

The local oscillator 954 is a precision fixed free-running clock source. The PLL 956 monitors the local oscillator 954 and signals from the antenna unit 902 by the transceiver unit 904 and generates an adjusted clock that tracks signals received from the antenna unit 902. The clock generator unit 908 can send the adjusted clock to any of the other functional units.

The frequency correction 602 modules of FIG. 6 can be implemented with the mobile communication system of FIG. 6. For example, the frequency correction 602 modules can be implemented with the clock generator unit 908, the local oscillator 954, the PLL 956, the transceiver unit 904, the RF receiver 922, the antenna unit 902, or a combination thereof.

The estimate channel tap 606 modules of FIG. 6 can be implemented with the mobile communication system of FIG. 6. For example, the estimate channel tap 606 modules can be implemented with the signal bridge unit 906, the A/D converter 926, the clock generator unit 908, the local oscillator 954, the PLL 956, the device control unit 916, the controller 942, the CPU 944, the local memory 946, the digital conditioner unit 914, the digital signal processor 932, the high speed memory, the device memory unit 912, the non-volatile memory 952, or a combination thereof.

The power spectral densities 610 modules of FIG. 6 can be implemented with the mobile communication system of FIG. 6. For example, the power spectral densities 610 modules can be implemented with the digital signal processor 932, the finite state machine 936, the fast Fourier transform 938, the digital conditioner unit 914, the device control unit 916, the controller 942, the CPU 944, the high speed memory 934, the local memory 946, the device memory unit 912, the non-volatile memory 952, or a combination thereof.

The measure Rician K factors 614 modules of FIG. 6 can be implemented with the mobile communication system of FIG. 6. For example, the measure Rician K factors 614 modules can be implemented with the finite state machine 936, the fast Fourier transform 938, the digital conditioner unit 914, the high speed memory 934, the device control unit 916, the CPU 944, the controller 942, the device memory unit 912, the non-volatile memory 952, or a combination thereof.

The Rician K decision 618 modules of FIG. 6 can be implemented with the mobile communication system of FIG. 6. For example, the Rician K decision 618 modules can be implemented with the digital signal processor 932, the finite state machine 936, the controller 942, the CPU 944, the high speed memory 934, the local memory 946, the device memory unit 912, the non-volatile memory 952, or a combination thereof.

The estimate Doppler frequency 620 modules of FIG. 6 can be implemented with the mobile communication system of FIG. 6. For example, the estimate Doppler frequency 620 modules can be implemented with the digital signal processor 932, the finite state machine 936, the controller 942, the CPU 944, the device memory unit 912, the local memory 946, the high speed memory 934, the non-volatile memory 952, or a combination thereof.

The calculate speed 622 modules of FIG. 6 can be implemented with the mobile communication system of FIG. 6. For example, the calculate speed 622 modules can be implemented with the digital signal processor 932, the finite state machine 936, the controller 942, the CPU 944, the device memory unit 912, the local memory 946, the high speed memory 934, the non-volatile memory 952, or a combination thereof.

The estimate LOS Doppler frequency 624 modules of FIG. 6 can be implemented with the mobile communication system of FIG. 6. For example, the estimate LOS Doppler frequency 624 modules can be implemented with the CPU 944, the controller 942, the digital signal processor 932, the device memory unit 912, the cache memory 948, the local memory 946, the finite state machine 936, the high speed memory 934, the non-volatile memory 952, or a combination thereof.

The LOS frequency 626 modules of FIG. 6 can be implemented with the mobile communication system of FIG. 6. For example, the LOS frequency 626 modules can be implemented with the CPU 944, the controller 942, the digital signal processor 932, the device memory unit 912, the cache memory 948, the local memory 946, the finite state machine 936, the high speed memory 934, the non-volatile memory 952, or a combination thereof.

The calculate LOS speed and direction 630 modules of FIG. 6 can be implemented with the mobile communication system of FIG. 6. For example, the calculate LOS speed and direction 630 modules can be implemented with the CPU 944, the controller 942, the digital signal processor 932, the device memory unit 912, the cache memory 948, the local memory 946, the finite state machine 936, the high speed memory 934, the non-volatile memory 952, or a combination thereof.

The dominant relative LOS Doppler frequency 632 modules of FIG. 6 can be implemented with the mobile communication system of FIG. 6. For example, the dominant relative LOS Doppler frequency 632 modules can be implemented with the CPU 944, the controller 942, the digital signal processor 932, the device memory unit 912, the cache memory 948, the local memory 946, the finite state machine 936, the high speed memory 934, the non-volatile memory 952, or a combination thereof.

The calculate dominant relative Doppler frequency 634 modules of FIG. 6 can be implemented with the mobile communication system of FIG. 6. For example, the calculate dominant relative Doppler frequency 634 modules can be implemented with the CPU 944, the controller 942, the digital signal processor 932, the device memory unit 912, the cache memory 948, the local memory 946, the finite state machine 936, the high speed memory 934, the non-volatile memory 952, or a combination thereof.

The handover decision handler 638 module of FIG. 6 can be implemented with the mobile communication system of FIG. 6. For example, the handover decision handler 638 module can be implemented with the CPU 944, the controller 942, the digital signal processor 932, the device memory unit 912, the cache memory 948, the non-volatile memory 952, the local memory 946, the high speed memory 934, or a combination thereof.

Figure 10:
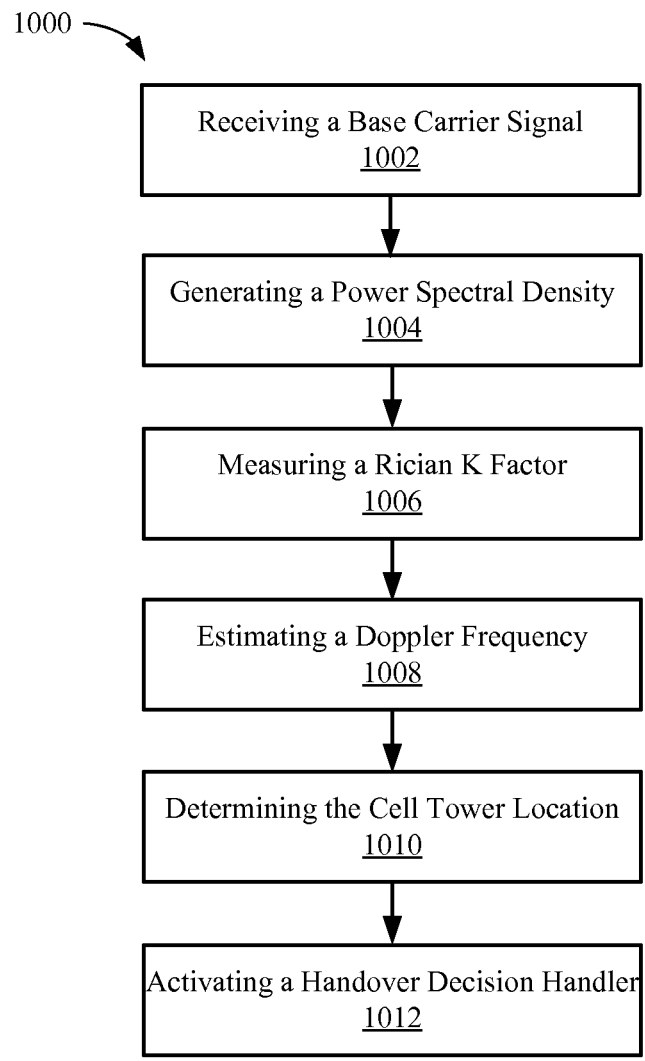
FIG. 10 is a flow chart of a method of operation of the mobile communication system of FIG. 1 in a further embodiment of the present invention.

Referring now to FIG. 10, therein is shown a flow chart of a method 1000 of operation of the mobile communication system 100 of FIG. 1 in a further embodiment of the present invention. The method 1000 includes: receiving a base carrier frequency signal from a cell tower location in a block 1002; generating a power spectral density from the base carrier frequency signal in a block 1004; measuring a Rician K factor from the power spectral density in a block 1006; estimating a line-of-sight Doppler frequency based on the base carrier frequency signal in a block 1008; determining the cell tower location based on the Rician K factor in a block 1010; and activating a handover decision handler based on the cell tower location in a block 1012.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a mobile communication system comprising:
    receiving a base carrier frequency signal for representing the base carrier frequency signal between a mobile device and a cell tower location;
    generating a power spectral density from the base carrier frequency signal;
    measuring a Rician K factor from the power spectral density;
    estimating a line-of-sight frequency and a Doppler frequency based on the power spectral density according to the Rician K factor;
    determining a movement for representing direction and speed of the mobile device relative to the cell tower location with a central processor unit based on the line-of-sight frequency, the Doppler frequency, and the Rician K factor; and
    activating a handover decision handler based on the cell tower location and the movement.

2. The method as claimed in claim 1 wherein estimating the line-of-sight Doppler frequency includes estimating the line-of-sight Doppler frequency based on the power spectral density.

3. The method as claimed in claim 1 further comprising counting samples of the base carrier frequency signal with a channel tap for generation of the power spectral density.

4. The method as claimed in claim 1 wherein measuring the Rician K factor includes determining power magnitudes of the power spectral density.

5. The method as claimed in claim 1 further comprising estimating a line-of-sight frequency based on the power spectral density.

6. The method as claimed in claim 1 wherein determining the cell tower location includes determining a mobile intercept angle of the mobile device.

7. The method as claimed in claim 1 wherein determining the cell tower location includes determining a mobile speed of the mobile device.

8. A mobile communication system comprising:
    an antenna for receiving a base carrier frequency signal for representing the base carrier frequency signal between a mobile device and a cell tower location;
    a digital conditioner unit for generating a power spectral density from the base carrier frequency signal;
    a digital signal processor for measuring a Rician K factor based on the power spectral density;
    a finite state machine for estimating a line-of-sight frequency and a Doppler frequency based on the power spectral density according to the Rician K factor;
    a central processor unit for determining a movement for representing direction and speed of the mobile device relative to the cell tower location based on the line-of-sight frequency, the Doppler frequency, and the Rician K factor; and
    a device control unit for activating a handover decision based on the cell tower location and the movement.

9. The system as claimed in claim 8 wherein the finite state machine is estimating the line-of-sight Doppler frequency based on the power spectral density.

10. The system as claimed in claim 8 further comprising a signal bridge unit for counting samples of the base carrier frequency signal with a channel tap for generation of the power spectral density.

11. The system as claimed in claim 8 wherein the digital signal processor is determining power magnitudes of the power spectral density.

12. The system as claimed in claim 8 further comprising an analog to digital converter for estimating a line-of-sight frequency based on the power spectral density.

13. The system as claimed in claim 8 further comprising a radio frequency receiver for determining a mobile intercept angle of the mobile device.

14. The system as claimed in claim 8 further comprising a controller for determining a mobile speed of the mobile device.

* * * * *